Patented July 4, 1950

2,514,300

UNITED STATES PATENT OFFICE 2,514,300

PREPARATION OF MERCAPTANS

Kenneth C. Laughlin, Wilmington, Del., assignor to Standard Oil Development Company, a corporation of Delaware No Drawing. Application July 25, 1946,
Serial No. 686,158

2 Claims. (Cl. 260—609)

This invention relates to a process for the preparation of mercaptans and has particular application to an improved reaction between hydrogen sulfide and alcohols or alcohols.

Mercaptans have become of increasing importance since synthetic rubber has come into wide usage because mercaptans have been found to impart superior qualities to synthetic rubber when present as an ingredient in a polymerization reaction mixture. Mercaptans are also valuable as ingredients in compounding synthetic rubber. Since considerable amounts of mercaptans are used in the preparation and processing of synthetic rubber an inexpensive and readily available source of mercaptans is desirable. An economically feasible starting material for the production of a mercaptan is the corresponding alcohol. Alcohols have been converted to mercaptans by the use of phosphorus trisulfide but this method has not been practiced on a large scale and the yield is not sufficient to make such a process feasible. The replacement of oxygen in alcohol by sulphur has also been accomplished by passing a mixture of hydrogen sulfide and alcohol vapor over thoria, heated to 300° C.; this process has not been practiced on a large scale and it results in the formation of substantial amounts of dialkyl sulfides with the resultant lowering of the yield of mercaptans. R. L. Kramer and E. E. Reid (J. A. C. S., 43, 880 (1921)) passed alcohols up to $C_5$ as a vapor with hydrogen sulfide over thoria and obtained a yield of mercaptan less than 50% with the exception of n-butyl mercaptan in which case the yield was only slightly higher. The corresponding aldehydes were obtained as by-products up to 15.9% and a small amount of olefin was generally present in the reaction product. There was no analysis for sulfides made although a large amount of reaction product was not accounted for in the above figures. J. Y. Johnson in the British patent, 454,668, led alcohol vapor and hydrogen sulfide over a catalyst known to assist in splitting off water, such as an oxide or salt of various metals alone or in admixture with each other or supported. He reported olefins and sulfides as by-products. The disadvantage of this procedure for replacing the oxygen in an alcohol with sulphur is that the temperature range is narrow and only a limited number of alcohols can be used. The art teaches that the reaction between hydrogen sulfide and an alcohol can be made with the formation of mercaptans and the reaction product consists of a substantial amount of mercaptans and also a substantial amount of dialkyl sulfide. It is a disadvantage to have dialkyl sulfides formed in the above reaction because it results in a lower yield of the desired mercaptan or mercaptans.

This invention has for an object the preparation of a mercaptan from alcohol and hydrogen sulfide with the formation of a minimum amount of dialkyl sulfide.

Another object of this invention is the formation of mercaptans from alcohols.

Still another object of this invention is to prepare mercaptans from alcohol and hydrogen sulfide in the presence of hydrogen.

Another and further object of this invention is to prepare mercaptans from alcohol and hydrogen sulfide in the presence of hydrogen and a catalyst.

Still another object of this invention is the preparation of mercaptans from mixed alcohols.

Other objects and a fuller understanding of the invention may be had by referring to the following description and claims.

These objects are accomplished by the following invention wherein alcohols are converted to mercaptans by heating the alcohol or alcohols with hydrogen sulfide and hydrogen. A catalyst may be used to increase the yield of mercaptans but it is possible to obtain a yield of mercaptans, without the use of a catalyst, which is superior to that obtained when hydrogen is not present in the reaction mixture. Whether a catalyst is present or not in the reaction described in this invention, the amount of undesirable dialkyl sulfide formed is minimized by the presence of hydrogen in the reaction mixture. A suitable catalyst is titanium oxide gel; other catalysts which may be used include oxides and sulfides of the following: Beryllium, magnesium, cadmium, zinc, copper, nickel, iron, titanium, zirconium, cerium, thorium, lead, phosphorus, vanadium, chromium, molybdenum, tungsten and uranium alone or in admixture with each other or supported on materials characterized by their high porosity.

The temperature of the reaction is substantially within the range from 300 to 800° F. and the pressure in the reaction vessel may vary widely but a pressure within the approximately range from 200 to 2000 lbs. per sq. in. gage or higher is preferred. The partial pressures of hydrogen and of hydrogen sulfide may vary widely, so long as a sufficient pressure of hydrogen sulfide is used to accomplish the reaction; the partial pressure of hydrogen is suitably in excess of that of the hydrogen sulfide. The time required to obtain the maximum yield of mercaptan material depends upon the alcohol or alcohols used and upon the amount of reactants in the reaction chamber. It may be necessary to add additional amounts of hydrogen during the course of the reaction to maintain the pressure at a satisfactory level. Upon completion of the reaction, the excess hydrogen is allowed to escape and the reaction mixture is filtered from insoluble catalysts; it may then be distilled in any suitable distillation apparatus to separate unreacted alcohol or alcohols from the mercaptan material formed. An alternate procedure may be to pass an inert gas through the liquid reaction mixture to remove unreacted hydrogen sulfide or the reaction mixture may be heated at a comparatively low temperature to remove the unreacted hydrogen sulfide.

This invention contemplates the use of a mixture of alcohols such as "Lorol" or any other mixture of alcohols. Aliphatic alcohols and aryl alcohols are suitable for use in practicing this invention and the invention is not restricted in scope to any particular molecular weight of the alcohol; it is applicable to simple low molecular weight, straight chain alcohols as well as to branched chain secondary, tertiary and high molecular weight alcohols. This invention is applicable to the preparation of the corresponding mercaptans from the butyl alcohols and from higher molecular weight alcohols up to 20 or more carbon atoms per molecule, and is especially suitable for use with alcohols of 8 to 16 carbon atoms. It is to be understood that the conditions of reaction as regards time, temperature, and pressure, may vary according to the alcohol used.

*Example 1*

300 cc. of "Lorol", a mixture of straight chain primary alcohols having an average molecular weight of 200 and 50 grams of fresh titanium oxide gel catalyst were placed in a 1000 cc. Aminco shaker bomb. Hydrogen sulfide was added until the pressure reached 125 p. s. i.; hydrogen was then added until the total pressure was 525 p. s. i. gage. The temperature was raised slowly to 600° F. and held at that temperature for two hours while the bomb was continually shaking. The bomb was cooled to room temperature and the pressure was then allowed to come to atmospheric pressure by letting the excess gases escape. The reaction mixture was removed and heated on a steam bath, then washed with water and at this point 83% by weight of the starting liquid remained. The product gave a positive qualitative test for mercaptan. The reaction mixture was distilled at 6 mm. pressure. 2.5 volume per cent distilled up to 240° F. and this fraction contained 5.35% sulphur. 88% distilled between 240 and 340° F. and the analysis for sulphur showed 6.03%. 7.5 volume per cent of bottoms were present which showed, upon analysis, 5.73% sulphur. The total recovery was 98 volume per cent.

*Example 2*

The same amounts and conditions were used as in Example 1, with the exception that no hydrogen was added to the bomb, but hydrogen sulfide was added until the pressure was 200 p. s. i. gage. Upon distillation of this reaction mixture after water washing as before, 5 volume per cent distilled up to 240° F. and showed a sulphur content of 8.75%. 62 volume per cent distilled between 240 and 340° F. and showed a sulphur content of 9.72%. 30 volume per cent of bottoms remains which showed a sulphur content of 8.97%. The total recovery was 97 volume per cent.

It is evident from the two examples given above that the amount of dialkyl sulfide formed in Example 2, wherein hydrogen was not present in the reaction mixture, is much larger than in Example 1. The dialkyl sulfides formed are higher boiling than the mercaptans formed and are substantially present in the bottoms which result when the temperature has been brought up to 340° F. during the course of the distillation.

The cut boiling between 240 and 340° F. in Example 1, was used directly in emulsion polymerization of butadiene with results equal to those obtained from a commercial grade of mercaptans obtained from Naugatuck Chemical Company.

While the above examples describe this process as conducted in batch operation with catalyst and reagents in a bomb or autoclave, the process may also be conducted in a continuous manner in which the reagents are passed through a reaction zone which may contain the catalyst. The catalyst may be suitably fixed in this zone in the form of beds or layers or it may be suspended as finely divided solid particles in a "fluidized" form in a rising stream of the reagents. In such operation, catalyst may be continuously or intermittently withdrawn from the reaction zone, passed through suitable heating and/or regeneration zones and returned to the reaction zone in order to control the temperature and the extent of the reaction proceeding therein.

It will be seen from the above description and examples of this invention that mercaptans are prepared from alcohol or alcohols, hydrogen sulfide, and hydrogen with the formation of a minimum amount of dialkyl sulfide.

As many apparently widely different embodiments of this invention may be made without departing from the spirit and scope thereof, it is to be understood that the invention is not to be limited to the specific embodiments thereof, except as defined in the appended claims.

What is claimed is:

1. A process for the preparation of aliphatic mercaptans with a minimum formation of organic sulfides which comprises heating a reaction mixture of aliphatic straight chain, primary, monohydric alcohols containing from 8 to 16 carbon atoms per molecule, hydrogen sulfide, and hydrogen, at a temperature within the range of 300° F. to 800° F. and at a pressure of 200 to 2,000 lbs. per sq. in. gage in the presence of a $TiO_2$ gel catalyst.

2. A process for the preparation of aliphatic mercaptans with a minimum formation of organic sulfides which comprises heating a mixture of aliphatic straight chain, primary, monohydric alcohols containing from 10 to 16 carbon atoms per molecule, hydrogen sulfide, and hydrogen, at a temperature within the range of about 600° F. and at a pressure of about 525 lbs. per sq. in. gage in the presence of a $TiO_2$ gel catalyst.

KENNETH C. LAUGHLIN.

REFERENCES CITED

The following references are of record in the file of this patent:

UNITED STATES PATENTS

| Number | Name | Date |
| --- | --- | --- |
| 2,070,761 | Szeszich | Feb. 16, 1937 |
| 2,116,182 | Baur | May 3, 1938 |
| 2,402,613 | Ferlow | June 25, 1946 |
| 2,402,640 | Lazier et al. | June 25, 1946 |

OTHER REFERENCES

Catalysis, Berkman et al., 1940, pages 281–282.
Richter's Organic Chemistry, vol. 1, 1919, page 142.